(12) United States Patent
Shen et al.

(10) Patent No.: US 11,299,569 B2
(45) Date of Patent: Apr. 12, 2022

(54) MATERIAL FOR 3D PRINTING, PROCESS FOR PREPARING THE SAME AND ARTICLE THEREOF

(71) Applicant: INSTITUTE OF CHEMISTRY, CHINESE ACADEMY OF SCIENCES, Beijing (CN)

(72) Inventors: Heng Shen, Beijing (CN); Jing Guo, Beijing (CN); Tang Zhu, Beijing (CN); Ning Zhao, Beijing (CN); Jian Xu, Beijing (CN); Wenhua Sun, Beijing (CN); Jinyong Dong, Beijing (CN); Chuncheng Li, Beijing (CN); Wenxin Fu, Beijing (CN); Xuechun Lin, Beijing (CN); Yongmei Ma, Beijing (CN)

(73) Assignee: INSTITUTE OF CHEMISTRY, CHINESE ACADEMY OF SCIENCES, Beijing (CN)

( * ) Notice: Subject to any disclaimer, the term of this patent is extended or adjusted under 35 U.S.C. 154(b) by 113 days.

(21) Appl. No.: 15/507,670

(22) PCT Filed: Apr. 24, 2015

(86) PCT No.: PCT/CN2015/077360
§ 371 (c)(1),
(2) Date: Feb. 28, 2017

(87) PCT Pub. No.: WO2015/165363
PCT Pub. Date: Nov. 5, 2015

(65) Prior Publication Data
US 2017/0253681 A1   Sep. 7, 2017

(30) Foreign Application Priority Data

Apr. 30, 2014 (CN) .......................... 201410183157.2
Apr. 30, 2014 (CN) .......................... 201410183469.3
Apr. 30, 2014 (CN) .......................... 201410183540.8

(51) Int. Cl.
*C08F 220/18* (2006.01)
*C08F 2/44* (2006.01)
*C08J 3/12* (2006.01)
*C08K 3/08* (2006.01)
*B29C 64/165* (2017.01)
(Continued)

(52) U.S. Cl.
CPC ........ *C08F 220/1803* (2020.02); *B28B 1/001* (2013.01); *B29C 64/106* (2017.08); *B29C 64/165* (2017.08); *B33Y 10/00* (2014.12); *B33Y 70/00* (2014.12); *C08F 2/44* (2013.01); *C08F 2/48* (2013.01); *C08F 2/50* (2013.01); *C08F 220/1802* (2020.02); *C08F 220/1807* (2020.02); *C08J 3/12* (2013.01); *C08J 3/203* (2013.01); *C08K 3/011* (2018.01); *C08K 3/013* (2018.01);
(Continued)

(58) Field of Classification Search
CPC .. C08F 220/18; C08F 2/48; C08F 2/50; C08F 2/44; C08F 2220/1825; C08F 2220/1883; C08F 2220/1808; C08F 2220/1816; B29C 67/0081; B29C 64/106; B29C 64/465; C08K 3/013; C08K 3/011; C08K 3/08; C08K 13/02; B33Y 70/00; B33Y 10/00; C08J 3/28
See application file for complete search history.

(56) References Cited

U.S. PATENT DOCUMENTS 5,863,319 A * 1/1999 Baker .................... C09D 11/34
106/31.29
8,097,399 B2 * 1/2012 Patel ...................... B33Y 70/00
264/401
(Continued)

FOREIGN PATENT DOCUMENTS

CN       1671810 A     9/2005
CN     103232608 A     8/2013
(Continued)

OTHER PUBLICATIONS

Yu, Wenhan et al.: "Preparation of UV curable resin for 3D printing", Adhesion, Dec. 31, 2013, pp. 56-58.

*Primary Examiner* — Jessica M Roswell
(74) *Attorney, Agent, or Firm* — Novick, Kim & Lee, PLLC; Allen Xue

(57) ABSTRACT

The present invention provides a composition for 3D printing, a process for preparing the same and an article thereof. By the solidifying method of UV irradiation, 3D printing is implemented. During said implementation, there is no need of high temperature heating, thus energy consumption is reduced, and there is no need for special solvent, thus harm to the environment is reduced. Meanwhile, the present invention uses micro-nano powder as the main material and polymer resin as adhesive, and at the same time, adds irradiation sensitizer. After electron beam irradiation, the polymer resin forms three-dimensional crosslinked network, thereby the strength, heat resistance and chemical resistance are improved after resin adhesion. Additionally, the present invention, by the addition of UV crosslinking agent, and by UV irradiation, cross-links the unsaturated resin after extrusion in 3D printing to form three-dimensional network structure, thus greatly improves the heat resistance, chemical resistance and mechanical strength of the shaping material, and makes the unsaturated resin have broader application prospects in 3D printing material.

4 Claims, No Drawings

(51) Int. Cl.
*B33Y 10/00* (2015.01)
*B33Y 70/00* (2020.01)
*B29C 64/106* (2017.01)
*C08F 2/48* (2006.01)
*C08J 3/20* (2006.01)
*C08K 3/011* (2018.01)
*C08K 3/013* (2018.01)
*B28B 1/00* (2006.01)
*C08F 2/50* (2006.01)

(52) U.S. Cl.
CPC .......... *C08K 3/08* (2013.01); *C08F 220/1804* (2020.02); *C08F 220/1812* (2020.02)

(56) References Cited

U.S. PATENT DOCUMENTS

| | | | | |
|---|---|---|---|---|
| 8,889,761 | B2 * | 11/2014 | Studart | B29C 67/24 523/115 |
| 2004/0056378 | A1 * | 3/2004 | Bredt | C04B 28/14 264/109 |
| 2005/0175925 | A1 * | 8/2005 | Johnson | G03F 7/032 430/280.1 |
| 2009/0148813 | A1 * | 6/2009 | Sun | A61C 13/0001 433/201.1 |
| 2010/0247873 | A1 * | 9/2010 | Yokoi | C09D 11/101 428/195.1 |
| 2011/0082238 | A1 * | 4/2011 | Patel | C09D 11/101 523/400 |
| 2014/0239527 | A1 * | 8/2014 | Lee | A61K 6/083 264/17 |
| 2015/0111176 | A1 * | 4/2015 | Wachter | A61C 13/26 433/180 |

FOREIGN PATENT DOCUMENTS

| | | | | |
|---|---|---|---|---|
| WO | | 200168375 A2 | 9/2001 | |
| WO | WO 2009-017648 | * | 2/2009 | ............. C09D 11/00 |

* cited by examiner ent product is poor in both heat resistance and rigidity. These limit their scope of application to a certain extent. Therefore, how to apply 3D printing technology to more polymers and improve the mechanical properties of printed products at the same time is a very great challenge.

MATERIAL FOR 3D PRINTING, PROCESS FOR PREPARING THE SAME AND ARTICLE THEREOF

TECHNICAL FIELD

The present invention relates to a composition for 3D printing, a process for preparing the same and an article thereof. The present invention also relates to a material for 3D printing, a process for preparing the same and an article thereof, and specifically to a UV radiation crosslinked polymer material for 3D printing, a process for preparing the same and an article thereof.

The present invention relates to a material for 3D printing, a process for preparing the same and an article thereof, and specifically to a high filling level micro-nano powder/polymer composite material for 3D printing, a process for preparing the same and an article thereof.

BACKGROUND OF THE INVENTION 3D printing is a burgeoning rapid prototyping technology, which is based on computer three-dimensional design model, by laser sintering, heating melting, etc., metal, ceramic powder or polymer materials are stacked and bonded layer by layer through the computer digital software program control, to thereby create a tangible product. In simple terms, 3D printing can be seen as superposition of 2D printing technology in the space. By the use of solid powder or polymer melt and other materials as printing "ink", and through the computer modeling design, product accuracy and size are precisely controlled. Compared to the traditional shaping technology, this printing technology does not require complex mold and process, the equipment is small, the program is controlled by the computer, and the operation is easy, thus it has drawn more and more attention and has gradually developed broad applications in biological, medical, construction and aviation fields and the like, particularly, it is suitable for small number, personalized, and complex structure of hollow parts.

Although 3D printing technology has attractive prospects for development, there are also great challenges. One of the biggest problem is that the physical and chemical properties of the materials limit the implementation technique. For example, the shaping material is mainly organic polymer materials at present, and direct shaping of metal materials is the research hotspot in the recent more than ten years, and is gradually being applied industrially. Nevertheless, all the processes are faced with the difficulty of how to improve accuracy, material performance and efficiency.

At present, fused deposition modeling technology is the most commonly-used 3D printing technology. Generally, nylon, ABS, polycarbonate, polyphenylene sulfone and other thermoplastic resins are melted at high temperatures, then are printed, deposited and solidified layer by layer, to form the final product. However, this kind of thermoplastic materials has slow modeling speed under high temperature melting condition, produces finished product that is poor in the strength, toughness and other performances, is prone to oxidative decomposition and other chemical reactions, and releases unpleasant, toxic gases, which are harmful to environment and human, and the printed product is poor in both heat resistance and rigidity. These limit their scope of application to a certain extent. Therefore, how to apply 3D printing technology to more polymers and improve the mechanical properties of printed products at the same time is a very great challenge.

DETAILED DESCRIPTION OF THE INVENTION

It is an object of the present invention to overcome the deficiencies of the prior art described above, to provide a composition for 3D printing, a preparation process and its use for 3D printing, which composition effectively avoids the defect of generation of unpleasant, toxic gas due to high temperature melting in fused deposition modeling technology. It is another object of the present invention to provide an article prepared from the above-described composition for 3D printing.

It is an object of the present invention to provide a high filling level micro-nano powder/polymer composite material for 3D printing, a preparation process and a use thereof It is a further object of the present invention to provide an article prepared from the above-described high filling level micro-nano powder/polymer composite material for 3D printing, which article has high strength and special functions.

The present invention also provides a process for preparing the above-described article. In order to achieve the above object, the present invention adopts the following technical solutions:

(I) A Composition Comprising Photosensitive Monomer

A composition for 3D printing comprises the following components:

photosensitive monomer: 100 parts by weight,
photoinitiator: 1 to 3 parts by weight,
micro-nano powder: 1 to 30 parts by weight,
crosslinking agent: 1 to 30 parts by weight,
toughening agent: 1 to 10 parts by weight, and
pigment: 5 to 10 parts by weight;

wherein the photosensitive monomer is monofunctional acrylate which is in liquid state at room temperature.

The photosensitive monomer used in the invention is a low viscosity liquid at room temperature, and is convenient for operation and mixing. Meanwhile, micro-nano powder is added to the matrix, and endows the composite with excellent mechanical properties and versatility.

According to the invention, the monofunctional acrylate which is in liquid state at room temperature is one or more selected from the group consisting of methyl methacrylate, ethyl methacrylate, propyl methacrylate, isopropyl methacrylate, benzyl methacrylate, lauryl methacrylate and acrylate derivatives.

According to the invention, it is preferred that the photoinitiator is alkylphenone. The alkylphenone is one or more selected from the group consisting of α,α-diethoxyacetophenone, α-hydroxyalkylphenone, and α-aminoalkylphenone.

The micro-nano powder according to the invention refers to a particulate matter having a particle size between 1 nm and 100 μm. Preferably, the micro-nano powder is one or more selected from the group consisting of inorganic micro-nano powder and organic-inorganic hybrid micro-nano powder. The inorganic micro-nano powder is one or more selected from the group consisting of metal particles, metal oxide particles, non-metallic particles, silver halide particles, carbonate particles, and phosphate particles. Preferably, the organic-inorganic hybrid micro-nano powder has a shell structure or an asymmetric structure.

Preferably, the particle size of the micro-nano powder is between 50 nm and 10 μm.

Preferably, the micro-nano powder is a micro-nano powder modified by a surface modifier.

Preferably, the surface modifier is one or more selected from the group consisting of dopamine and silane coupling agents such as KH550, KH560, KH570, KH792 or DL602.

According to the invention, it is preferred that the crosslinking agent is a multifunctional acrylate. The multifunctional acrylate is one or more selected from the group consisting of bifunctional crosslinking agents (such as diethylene glycol dimethacrylate, triethylene glycol dimethacrylate, tetraethylene glycol dimethacrylate, etc.), and trifunctional crosslinking agents (such as trimethylolpropane trimethacrylate, trimethylolpropane triacrylate, etc.).

According to the invention, it is preferred that the toughening agent is a liquid polysulfide rubber. According to the invention, it is preferred that the pigment is an inorganic color pigment. The inorganic color pigment is one or more selected from the group consisting of chromate pigments (such as lead chrome yellow, molybdenum chrome orange, etc.), cadmium pigments (such as cadmium yellow, cadmium red, etc.), iron pigments (such as iron yellow, iron red, etc.), green pigments (such as chrome green, chromium oxide green, etc.) and blue pigments (such as iron blue, ultramarine, etc.).

The invention also provides the following technical solution:

A process for preparing the composition for 3D printing described above, which comprises the steps of mixing various components.

According to the invention, the process specifically comprises the following steps:

1) mixing 100 parts by weight of a photosensitive monomer, 1 to 30 parts by weight of a micro-nano powder, 1 to 30 parts by weight of a crosslinking agent and 5 to 10 parts by weight of a pigment; and 2) mixing the mixture obtained in step 1) with 5 to 10 parts by weight of a toughening agent, and 1 to 3 parts by weight of a photoinitiator.

According to the invention, both of the above-described mixing operations are carried out at room temperature (20 to 40° C.).

According to the invention, the mixing in step 1) is carried out sufficiently by mechanical stirring at a rotational speed of 1000 to 4000 rpm for 1 to 2 hours.

According to the invention, step 2) is the step of sufficiently mixing for 1 to 2 hours at a rotational speed of 1000 to 4000 rpm under dark condition.

The invention also provides the following technical solutions:

An article prepared by the composition for 3D printing described above by 3D printing.

A use of a composition for 3D printing described above for 3D printing.

Stereolithography (SLA—Stereo Lithography Apparatus) is one kind of 3D printing technology, and is the first rapid prototyping manufacturing technology, with a high degree of maturity. Usually, liquid unsaturated polymer monomer or prepolymer is used, with the addition of a small amount of photoinitiator, is crosslinked and solidified under UV irradiation of a specific wavelength and intensity, and is stacked layer by layer to form the final three-dimensional objects. Usually this process uses liquid raw materials, with good flowability, can be operated at room temperature without the application of high temperature, causes little environmental pollution, has fast shaping speed and short production cycle, and does not need cutting tools and molds, thus is suitable for the production of material which is complex in structure and difficult to shape. It has important applications in aerospace, automobile manufacturing, mold development, electrical apparatus and other fields. Acrylates and their homologues can be polymerized at room temperature under UV irradiation due to the presence of highly active terminal olefinic bonds. The polymerization products have excellent oil resistance and high temperature oxidation resistance, thus they are widely used in adhesive, synthetic resin, special rubber and plastic fields. In the present invention, the above-described properties of the acrylates and their homologues are combined with the advantages of the stereolithography to provide a 3D printing article which is low in production cost, simple in production process and easy to be industrially produced.

The beneficial effects of the composition for 3D printing comprising a photosensitive monomer are as follows:

1. The present invention uses a photosensitive monomer having excellent flowability at room temperature as a raw material for 3D printing, and mixes it with micro-nano powder by a simple process, and does not need a special large size apparatus and a heating apparatus.

2. The photosensitive monomer of the invention can be rapidly solidified and shaped under UV irradiation, and has greatly improved the production efficiency.

3. The 3D printing material of the invention does not release toxic gas during use and reduces the harm to the environment.

4. The invention is in low production cost, simple in production process and easy for industrial production.

5. The invention can obtain products having different colors and different performances by changing the added micro-nano powder and pigment.

(II) Composite Material Comprising Polymer Resin

A high filling level micro-nano powder/polymer composite material for 3D printing using a micro-nano powder as the main raw material and a polymer resin as adhesive has the following raw materials and their contents (parts by weight):

micro-nano powder: 90 to 70 parts,
polymer resin: 10 to 30 parts, and
irradiation sensitizer: 0.05 to 0.2 parts.

According to the invention, the composite material is prepared by a process comprising the mixing of raw materials and extrusion pelletization by a screw extruder.

The micro-nano powder according to the invention refers to a particulate matter having a particle size between 1 nm and 100 μm. Preferably, the micro-nano powder is an inorganic micro-nano powder; and more preferably, the inorganic micro-nano powder is one or more selected from the group consisting of metal powder, metal oxide powder, non-metallic powder, silver halide powder, carbonate powder, phosphate powder, silicate powder, and clay powder.

Preferably, the particle size of the micro-nano powder is between 50 nm and 10 μm.

Preferably, the micro-nano powder is a micro-nano powder modified by a surface modifier.

Preferably, the surface modifier is one or more selected from the group consisting of dopamine and silane coupling agents such as KH550, KH560, KH570, KH792 or DL602.

According to the invention, the polymer resin is a thermoplastic resin. The thermoplastic resin is one or more selected from the group consisting of polyolefins (PE, PP, PVC, PS), polyamide (PA), polycarbonate (PC), polyoxymethylene (POM), ethylene-vinyl acetate copolymer (EVA), polyester (PET, PBT, PCL, PLA), acrylonitrile-styrenebutadiene copolymer (ABS), styrene-butadiene-styrene block copolymer (SBS), styrene-isoprene-styrene block copolymer (SIS), butadiene-styrene transparent impact resin (K resin), and polyacrylate.

According to the invention, the selected polymer resin has a melt index of at least greater than 10.

According to the invention, the radiation sensitizer is one or more selected from the group consisting of triallyl cyanurate, triallyl isocyanurate, trimethallyl isocyanurate, trimethylolpropane trimethacrylate, trimethylolpropane triacrylate, triallyl 1,3,5-benzenetricarboxylate, diallyl isocyanate, diallyl isophthalate, bismaleimide, triethylene glycol dimethacrylate, and diethylene glycol dimethacrylate.

According to invention, the raw materials further comprise: antioxidant 0.01-0.02 parts.

According to the invention, the antioxidant is a hindered phenolic antioxidant and/or a phosphite auxiliary antioxidant. Preferably, it is one or more selected from the group consisting of antioxidant 1010: pentaerythritol tetra[β-(3,5-di-tert-butyl-4-hydroxyphenyl) propionate]; antioxidant 1096: IRGANOX B-1096; coordinated compound of main antioxidant 1098: 3,3'-bis(3,5-di-tert-butyl-4-hydroxyphenyl)-N,N'-hexamethylenedipropionamide with phosphite antioxidant; and antioxidant 168: tris [2,4-di-tert-butylphenyl] phosphite.

According to the invention, the raw materials of the material and their contents (parts by weight) are:
 micro-nano powder: 90 to 70 parts,
 polymer resin: 10 to 30 parts,
 irradiation sensitizer: 0.05 to 0.2 parts, and
 antioxidant: 0.01 to 0.02 parts.

The invention also provides the following technical solution:

A process for preparing the high filling level micro-nano powder/polymer composite material for 3D printing described above comprising the steps of mixing of raw materials and extrusion pelletization by a screw extruder.

According to the invention, the process specifically comprises:
 1) modifying the micro-nano powder;
 2) mixing the various raw materials; and
 3) extruding and pelletizing by a screw extruder.

According to the invention, the above step 1) specifically comprises subjecting 100 parts by weight of the micro-nano powder to surface modification with 5 to 20 parts of the surface modifier in solution.

According to the invention, the step 2) specifically comprises the steps of: uniformly mixing 10 to 30 parts by weight of a polymer resin, 90 to 70 parts of modified micro-nano powder, 0.05 to 0.2 parts of a radiation sensitizer, and 0.01 to 0.02 parts of an antioxidant at room temperature, and feeding the mixture to a twin-screw extruder having an aspect ratio of 36 for extrusion pelletization, wherein the rotational speed of the extruder is 20 to 100 r/min, the temperature ranges of the various sections of the extruder are: feeding section 150 to 170° C., melting section 190 to 200° C., mixing section 190 to 200° C., exhaust section 170 to 190° C., and homogenization section 160 to 180° C.

The invention also provides the following technical solutions:

An article prepared by the above-described high filling level micro-nano powder/polymer composite material for 3D printing by 3D printing.

A process for preparing the above-described article comprising the step of subjecting the above-described high filling level micro-nano powder/polymer composite material for 3D printing to 3D printing.

According to the invention, the step specifically comprises: feeding the pellets of the composite material to the head of the 3D printer, heating and melting the pellets in the head, moving the head along the sectional profile and the filling path of the part while at the same time extruding the melted material, rapidly solidifying the melted material after extrusion under computer control and irradiating it using electron beam, to crosslink the material, and forming shape by accumulation layer by layer.

According to the invention, the parameters of the irradiation are specifically as follows: the electron accelerator energy of 0.3 to 5 MeV, the power of 50 to 150 KW, and the irradiation dose of 5 to 20 KGy.

A use of the above-described high filling level micro-nano powder/polymer composite material for 3D printing is for 3D printing.

The prominent features of the composite material comprising the polymer resin are as follows:

1. The micro-nano powder in the composite material of the invention is chemically modified, thus effectively enhances the interaction between the powder and the polymer resin.

2. The composite material of the invention makes the polymer resin form a three-dimensional crosslinked network by the electron irradiation technology in the preparation process, and improves the thermal stability and chemical resistance of the resin, thereby the performance of the composite material is improved.

3. The composite material of the invention has various excellent properties as described above, and is particularly suitable for use as a material for 3D printing. The resulting article has excellent hardness, dimensional stability, and heat resistance, and according to the different micro-nano powders as filled, can have electrical conductivity, thermal conductivity, flame resistance, wear resistance, gas barrier and other special functions at the same time.

(III) Polymer Composition Comprising Unsaturated Resin

It is an object of the present invention to improve the heat resistance, chemical resistance and mechanical properties of a 3D printing article by adding a UV crosslinking agent to an unsaturated 3D printing polymer material, and irradiating it with UV during its solidifying to form a three-dimensional crosslinked network.

Specifically, the invention discloses a UV radiation crosslinked polymer composition for 3D printing comprising the following main components:
 unsaturated resin: 100 parts by weight, and
 UV crosslinking agent: 0.5 to 5 parts by weight, wherein the unsaturated resin is selected from monofunctional or multifunctional ethylenically unsaturated polymers having a molecular weight of from 3,000 to 100,000, preferably from 3,000 to 500,000, and having a melting point (or softening flow temperature) between 100 and 350° C.; and wherein the UV crosslinking agent is a C3 or higher compound containing two or more terminal mercapto groups.

In a preferred embodiment of the invention, one or more from the group consisting of pentaerythritol tetraki s(2-mercaptoacetate), 4',4-dimercaptodiphenyl sulfide, 2,5-dimercaptothiadiazole, trithiocyanuric acid and their homologues and derivatives is selected as the UV crosslinking agent. Further, the UV cross-linking agent is used in an amount of 0.5 to 5 parts by weight in relative to 100 parts by weight of the unsaturated resin. Since the activity of the UV crosslinking agent is high, the addition of only a small amount can achieve the crosslinking purpose, thereby cost is saved.

According to the invention, the monofunctional or multifunctional ethylenically unsaturated polymer is preferably one or more selected from the group consisting of polyolefins (such as PE, PP, PVC, PS, PB, etc.), polyalkynes (such as polyacetylene, polypropyne, etc.), unsaturated polyamides, unsaturated polycarbonates, unsaturated polyesters, ABS resins, and bicomponent or multicomponent copolymers of polyunsaturated olefins (such as butadiene, isoprene, etc.) and other olefinic monomers (such as styrene-butadiene-styrene block copolymer (SBS), styrene-isoprene-styrene block copolymer (SIS) and butadiene-styrene transparent impact resin (K resin)).

According to the invention, the UV crosslinking agent includes, but is not limited to, pentaerythritol tetramercaptoacetate, 4',4-dimercaptodiphenyl sulfide, 2,5-dimercaptothiadiazole, trithiocyanuric acid or their homologues and derivatives, as well as combinations of the above-described compounds in any ratio.

According to the invention, the composition further comprises an aid for enhancing the printing effect without affecting its main function, specifically including:

Antioxidant: 0.1-0.5 parts by weight,
Powder: 1-20 parts by weight,
Pigment: 0-10 parts by weight, and
Other aids: 0-5 parts by weight.

According to the invention, it is preferred that the antioxidant is one or more selected from the group consisting of antioxidant 1010, antioxidant 1096, coordinated compound of main antioxidant 1098 and phosphite antioxidant and antioxidant 168. Among them, antioxidant 1010 refers to: pentaerythritol tetra[$\beta$-(3,5-di-tert-butyl-4-hydroxyphenyl) propionate]; antioxidant 1096 refers to: IRGANOX B-1096; main antioxidant 1098 refers to: 3,3'-bis(3,5-di-tert-butyl-4-hydroxyphenyl)-N,N'-hexamethylenedipropionamide; and antioxidant 168 refers to: tris [2,4-di-tert-butylphenyl] phosphite.

According to the invention, the powder is preferably a particulate material having a particle size between 1 nm and 100 μm (also referred to as micro-nano particles). Preferably, the powder is one or more selected from the group consisting of inorganic micro-nano particles, organic polymer micro-nano particles and organic-inorganic hybrid micro-nano particles. Preferably, the inorganic micro-nano particles are one or more selected from the group consisting of metal micro-nano particles (such as silver, gold, iron, platinum particles, etc.), metal oxide micro-nano particles (such as $Fe_3O_4$, $TiO_2$, $Cu_2O$, ZnO, CdS particles, etc.), non-metallic micro-nano particles (such as carbon, silicon particles, etc.), silver halide micro-nano particles (such as AgCl, AgBr particles, etc.), carbonate micro-nano particles (such as $CaCO_3$, $BaCO_3$ particles, etc.) and phosphate micro-nano particles (such as $LiFePO_4$ particles, etc.).

Preferably, the organic polymer micro-nano particles are one or more selected from the group consisting of polystyrene, polypropylene, polytetrafluoroethylene, ABS, epoxy resins, and other micro-nano particles. Preferably, the organic-inorganic hybrid micro-nano particles have one or more of a core-shell structure or an asymmetric structure, such as PS @ $Fe_3O_4$, PS @ Dopa @ Ag, etc.

According to the invention, it is preferred that the pigment is an inorganic color pigment. The inorganic color pigment is one or more selected from the group consisting of chromate pigments (such as lead chrome yellow, molybdenum chrome orange, etc.), cadmium pigments (such as cadmium yellow, cadmium red, etc.), iron pigments (such as iron yellow, iron red, etc.), green pigments (such as chrome green, chromium oxide green, etc.) and blue pigments (such as iron blue, ultramarine, etc.).

According to the invention, the other aid is an aid suitable for composition for 3D printing, such as inhibitor (mainly for preventing the material from being ineffective due to polymerization during storage and transportation), etc. The inhibitor is conventional aid known to those skilled in the art.

The invention also provides the following technical solution:

A UV radiation crosslinked polymer material for 3D printing, which is prepared from the UV radiation crosslinked polymer composition for 3D printing described above.

According to the invention, the material is prepared by a process comprising the following steps: uniformly mixing 100 parts by weight of an unsaturated resin, 0.5 to 5 parts by weight of a UV crosslinking agent and optionally 0.1 to 0.5 parts by weight of an antioxidant, 1 to 20 parts by weight of a powder, 0 to 10 parts by weight of a pigment and 0-5 parts by weight of other aids, and extruding into filaments.

According to the invention, the mixing is carried out with a single screw extruder.

The invention also provides the following technical solution:

A process for preparing the above-described UV radiation crosslinked polymer material for 3D printing, comprising the following steps:

uniformly mixing 100 parts by weight of an unsaturated resin, 0.5 to 5 parts by weight of a UV crosslinking agent and optionally 0.1 to 0.5 parts by weight of an antioxidant, 1 to 20 parts by weight of a powder, 0 to 10 parts by weight of a pigment and 0-5 parts by weight of other aids, and extruding into filaments.

According to the invention, the mixing is carried out with a single screw extruder.

According to the invention, the process comprises following the steps:

uniformly mixing 100 parts by weight of an unsaturated resin, 0.5 to 5 parts by weight of a UV crosslinking agent, 0.1 to 0.5 parts by weight of an antioxidant, 1 to 20 parts by weight of a powder, 0 to 10 parts by weight of a pigment and 0-5 parts by weight of other aids, and extruding into filaments.

According to the invention, the mixing is carried out with a single screw extruder.

The invention also provides the following technical solution:

An article prepared by the above-described UV radiation crosslinked polymer material for 3D printing by 3D printing. It can be seen that the present invention uses a polymer having a melting point (or softening flow temperature) between 100 and 350° C., and adopts the fused deposition modeling (FDM, i.e., the polymer is heated to a temperature above the softening flow temperature, extruded, cooled to form shape, and then is subjected to UV crosslinking to increase its strength) to prepare the article, that is, the present invention combines the specific polymer, UV crosslinking and FDM technology to prepare articles with multiple performances (such as heat resistance, chemical resistance and mechanical strength, etc.) being improved greatly.

A process for preparing the above-described article comprises the step of subjecting the UV radiation crosslinked polymer material for 3D printing described above to 3D printing.

According to the invention, the step specifically comprises:

uniformly mixing 100 parts by weight of an unsaturated resin, 0.5 to 5 parts by weight of a UV crosslinking agent and optionally 0.1 to 0.5 parts by weight of an antioxidant, 1 to 20 parts by weight of a powder, 0 to 10 parts by weight of a pigment and 0-5 parts by weight of other aids, and extruding into filaments; and feeding the above filaments through a filament feeding device to the head of a 3D printer based on fused deposition modeling (FDM), heating and melting the filaments in the head, moving the head along the sectional profile and the filling path of the part while at the same time extruding the melted material, by utilizing the hot meltability and adhesion of the material, rapidly solidifying the melted material after extrusion under computer control, and irradiating it using UV having a wavelength of 400-315 nm, 315-280 nm, or 280-190 nm, to crosslink the material, and forming shape by accumulation layer by layer.

According to the invention, the mixing is carried out with a single screw extruder.

A use of the UV radiation crosslinked polymer composition or material for 3D printing described above is for 3D printing.

The invention has the following beneficial effects:

1. The invention adopts the unsaturated resin with relatively large molecular weight, specifically, monofunctional or multifunctional ethylenically unsaturated polymer, and then adds polythiol compound as the UV crosslinking agent, to cause the mercapto-vinyl click reaction under UV irradiation, so that the unsaturated resin is crosslinked. The result is that the strength of the article prepared by 3D printing is increased, and further due to the excellent flexibility of the C-S bond, the resulting article also has a very high toughness.

2. The invention, by adding UV crosslinking agent, and crosslinking the extruded polymer simultaneously with the UV during the 3D printing process, effectively improves the heat resistance, chemical resistance and mechanical property of the 3D printing article.

3. The printed article of the invention is greatly improved in heat resistance, chemical resistance and mechanical strength due to the presence of a three-dimensional cross-linked network, thus the polymer resin has broader application prospects in 3D printing material.

4. The mercapto-olefin click reaction under UV in the present invention has the characteristics of being simple and highly efficient, and the cost is low, and the crosslinking effect satisfying the practical requirements can be achieved without the further addition of other catalyst.

5. The invention can obtain products having different colors and different performances by changing the added powder and pigment.

DETAILED DESCRIPTION OF VARIOUS EMBODIMENTS

The following examples are intended to further illustrate the present invention in detail, but are not intended to limit the scope of the invention. It will be understood that various replacements and alterations made without departing from the above-described methodological idea of the invention and in accordance with the common technical knowledge and conventional means in the art shall be within the scope of the invention.

EXAMPLE 1.1

A 3D Printing Article A 1) 100 parts by weight of methyl methacrylate, 10 parts of nano $CaCO_3$ powder, 10 parts of diethylene glycol dimethacrylate and 5 parts of iron blue were mixed at a rotational speed of 2000 rpm for 1 hour at room temperature;

2) the mixture obtained in step 1) was mixed with 1 part of liquid polysulfide rubber and 1 part of α,α-diethoxyacetophenone at a rotational speed of 2000 rpm for 1 hour at room temperature under dark condition; and 3) the mixture obtained in step 2) was printed using a PROJET 1200 type SLA 3D printer through CAD program control, and solidified by UV at room temperature to form shape, to thereby obtain article A.

The article A was blue. The addition of nano $CaCO_3$ powder endowed the article with excellent dimensional stability, and significantly improved strength and toughness.

EXAMPLE 1.2

A 3D Printing Article B 1) 100 parts by weight of ethyl methacrylate, 15 parts of nano Ag powder, 10 parts of diethylene glycol dimethacrylate and 5 parts of iron blue were mixed at a rotational speed of 2000 rpm for 1 hour at room temperature;

2) the mixture obtained in step 1) was mixed with 5 parts of liquid polysulfide rubber and 2 parts of α-hydroxyalkylphenone at a rotational speed of 2000 rpm for 1 hour at room temperature under dark condition; and 3) the mixture obtained in step 2) was printed using a PROJET 1200 type SLA 3D printer through CAD program control, and solidified by UV at room temperature to form shape, to thereby obtain article B.

The article B was blue. The addition of nano Ag powder endowed the article with improved dimensional stability, strength and toughness, and at the same time, with excellent electrical conductivity. Highly conductive article having special shape could be printed according to need.

EXAMPLE 1.3

A 3D Printing Article C 1) 100 parts by weight of methyl methacrylate, 20 parts of nano $Fe_3O_4$ powder, 10 parts of diethylene glycol dimethacrylate and 10 parts of chrome green were mixed at a rotational speed of 2000 rpm for 1 hour at room temperature;

2) the mixture obtained in step 1) was mixed with 10 parts of liquid polysulfide rubber and 3 parts of α-hydroxyalkylphenone at a rotational speed of 2000 rpm for 1 hour at room temperature under dark condition; and 3) the mixture obtained in step 2) was printed using a PROJET 1200 type SLA 3D printer through CAD program control, and solidified by UV at room temperature to form shape, to thereby obtain article C.

The article C was green. The addition of nano $Fe_3O_4$ powder endowed the article with improved dimensional stability, strength and toughness, and at the same time with response to the magnetic field.

EXAMPLE 1.4

A 3D Printing Room Temperature UV Solidifying Material 1) 100 parts by weight of methyl methacrylate, 30 parts of micron $Al_2O_3$ powder, 20 parts of triethylene glycol dimethacrylate, and 10 parts of iron yellow were mixed at a rotational speed of 2000 rpm for 1 hour at room temperature;

2) the mixture obtained in step 1) was mixed with 1 part of liquid polysulfide rubber and 2 parts of a-hydroxyalkylphenone at a rotational speed of 2000 rpm for 1 hour at room temperature under dark condition; and 3) the mixture obtained in step 2) was printed using a PROJET 1200 type SLA 3D printer through CAD program control, and solidified by UV at room temperature to form shape, to thereby obtain article D.

The article D was yellow. The addition of micron $Al_2O_3$ powder endowed the article with improved dimensional stability, strength and toughness, and at the same time with good thermal conductivity, thus enabled the article to be applied to fields of heat conduction and electronic packaging.

EXAMPLE 1.5

A 3D Printing Article E 1) 100 parts by weight of propyl methacrylate, 10 parts of a micron montmorillonite powder, 20 parts of trimethylolpropane trimethacrylate, and 5 parts of iron yellow were mixed at a rotational speed of 2000 rpm for 1 hour at room temperature;

2) the mixture obtained in step 1) was mixed with 5 parts of liquid polysulfide rubber and 1 part of α-aminoalkylphenone at a rotational speed of 2000 rpm for 1 hour at room temperature under dark condition; and 3) the mixture obtained in step 2) was printed using a PROJET 1200 type SLA 3D printer through CAD program control, and solidified by UV at room temperature to form shape, to thereby obtain article E.

The article E was yellow. The addition of micron montmorillonite powder endowed the article with significantly improved impact resistance, fatigue resistance and gas barrier properties.

EXAMPLE 1.6

A 3D Printing Article F 1) 100 parts by weight of benzyl methacrylate, 15 parts of a micron $ZrO_2$ powder, 30 parts of trimethylolpropane triacrylate, and 10 parts of cadmium red were mixed at a rotational speed of 2000 rpm for 1 hour at room temperature;

2) the mixture obtained in step 1) was mixed with 10 parts of liquid polysulfide rubber and 2 parts of α,α-diethoxyacetophenone at a rotational speed of 2000 rpm for 1 hour at room temperature under dark condition; and 3) the mixture obtained in step 2) was printed using a PROJET 1200 type SLA 3D printer through CAD program control, and solidified by UV at room temperature to form shape, to thereby obtain article F.

The article F was red. The addition of micron $ZrO_2$ powder endowed the article with significantly improved fire resistance, thus enabled the product to be applied to printing of special refractory material.

EXAMPLE 2.1

A High Filling Level Micro-Nano Powder/Polymer Composite Material for 3D Printing 1) 100 parts by weight of 500 nm Ag powder and 5 parts of dopamine were homogeneously mixed in 200 parts of Tris buffer (pH 8.5), reacted for 24 hours, washed several times and then dried at 70° C.; and 2) 10 parts by weight of PE (melt index: 11.5), 90 parts of modified Ag powder, 0.05 parts of irradiation sensitizer triallyl cyanurate, and 0.02 parts of antioxidant 1010 were homogeneously mixed at room temperature, and fed into a twin-screw extruder having an aspect ratio of 36 for extrusion pelletization (recorded as pellets A), wherein the rotational speed of the extruder was 20 r/min, and the temperature ranges of the various sections of the extruder were: feeding section 150-170° C., melting section 190-200° C., mixing section 190-200° C., exhaust section 170-190° C., and homogenization section 160-180° C.

EXAMPLE 2.2

A 3D Printing Article Prepared From the Composite Material of Example 2.1

The pellets A obtained in Example 2.1 were added to the head of the 3D printer, and heated and melted in the head, the head was moved along the sectional profile and the filling path of the part while at the same time the melted material was extruded, by utilizing the hot meltability and adhesion of the material, it was rapidly solidified after extrusion under computer control, and irradiation was carried out using electron beam (electron accelerator energy of 0.5 MeV, power of 50 KW, and irradiation dose of 5 KGy), so that the material was crosslinked, and formed shape by accumulation layer by layer.

The obtained 3D printing article had excellent hardness, dimensional stability and electrical conductivity.

EXAMPLE 2.3

A High Filling Level Micro-Nano Powder/Polymer Composite Material for 3D Printing 1) 100 parts by weight of 500 nm $Al_2O_3$ powder and 10 parts of silane coupling agent KH550 were homogeneously mixed in 200 parts of water, reacted for 24 hours at 60° C., washed several times and then dried at 70° C.; and 2) 15 parts by weight of PP (melt index: 12.2), 85 parts of modified $Al_2O_3$ powder, 0.1 parts of irradiation sensitizer triallyl isocyanurate, and 0.01 parts of antioxidant 1096 were homogeneously mixed at room temperature, and fed into a twin-screw extruder having an aspect ratio of 36 for extrusion pelletization (recorded as pellets B), wherein the rotational speed of the extruder was 40 r/min, and the temperature ranges of the various sections of the extruder were: feeding section 150-170° C., melting section 190-200° C., mixing section 190-200° C., exhaust section 170-190° C., and homogenization section 160-180° C.

EXAMPLE 2.4

A 3D Printing Article Prepared From the Composite Material of Example 2.3

The pellets B obtained in Example 2.3 were added to the head of the 3D printer, and heated and melted in the head, the head was moved along the sectional profile and the filling path of the part while at the same time the melted material was extruded, by utilizing the hot meltability and adhesion of the material, it was rapidly solidified after extrusion under computer control, and irradiation was carried out using electron beam (electron accelerator energy of 0.75 MeV, power of 75 KW, and irradiation dose of 10

KGy), so that the material was crosslinked, and formed shape by accumulation layer by layer.

The obtained 3D printing article had excellent mechanical strength, dimensional stability and thermal conductivity.

EXAMPLE 2.5

A High Filling Level Micro-Nano Powder/Polymer Composite Material for 3D Printing 1) 100 parts by weight of 1μm $CaCO_3$ powder and 15 parts of silane coupling agent KH560 were homogeneously mixed in 200 parts of water, reacted for 24 hours at 60° C., washed several times and then dried at 70° C.; and 2) 20 parts by weight of PA (melt index: 10.5), 80 parts of modified $CaCO_3$ powder, 0.2 parts of irradiation sensitizer trimethylolpropane trimethacrylate, and 0.01 parts of antioxidant 1098 were homogeneously mixed at room temperature, and fed into a twin-screw extruder having an aspect ratio of 36 for extrusion pelletization (recorded as pellets C), wherein the rotational speed of the extruder was 60 r/min, and the temperature ranges of the various sections of the extruder were: feeding section 150-170° C., melting section 190-200° C., mixing section 190-200° C., exhaust section 170-190° C., and homogenization section 160-180° C.

EXAMPLE 2.6

A 3D Printing Article Prepared From The Composite Material of Example 2.5

The pellets C obtained in Example 2.5 were added to the head of the 3D printer, and heated and melted in the head, the head was moved along the sectional profile and the filling path of the part while at the same time the melted material was extruded, by utilizing the hot meltability and adhesion of the material, it was rapidly solidified after extrusion under computer control, and irradiation was carried out using electron beam (electron accelerator energy of 1 MeV, power of 100 KW, and irradiation dose of 15 KGy), so that the material was crosslinked, and formed shape by accumulation layer by layer.

The obtained 3D printing article had excellent mechanical strength, dimensional stability and heat resistance.

EXAMPLE 2.7

A High Filling Level Micro-Nano Powder/Polymer Composite Material for 3D Printing 1) 100 parts by weight of 4 μm $ZrO_2$ powder and 20 parts of silane coupling agent KH570 were homogeneously mixed in 200 parts of water, reacted for 24 hours at 60° C., washed several times and then dried at 70° C.; and 2) 25 parts by weight of PC (melt index: 15), 75 parts of modified $ZrO_2$ powder, 0.05 parts of irradiation sensitizer trimethylolpropane trimethacrylate, and 0.01 parts of antioxidant 168 were homogeneously mixed at room temperature, and fed into a twin-screw extruder having an aspect ratio of 36 for extrusion pelletization (recorded as pellets D), wherein the rotational speed of the extruder was 80 r/min, and the temperature ranges of the various sections of the extruder were: feeding section 150-170° C., melting section 190-200° C., mixing section 190-200° C., exhaust section 170-190° C., and homogenization section 160-180° C.

EXAMPLE 2.8

A 3D Printing Article Prepared From the Composite Material of Example 2.7

The pellets D obtained in Example 2.7 were added to the head of the 3D printer, and heated and melted in the head, the head was moved along the sectional profile and the filling path of the part while at the same time the melted material was extruded, by utilizing the hot meltability and adhesion of the material, it was rapidly solidified after extrusion under computer control, and irradiation was carried out using electron beam (electron accelerator energy of 1.5 MeV, power of 125 KW, and irradiation dose of 20 KGy), so that the material was crosslinked, and formed shape by accumulation layer by layer.

The obtained 3D printing article had excellent mechanical strength, dimensional stability, heat resistance and wear resistance.

EXAMPLE 2.9

A High Filling Level Micro-Nano Powder/Polymer Composite Material for 3D Printing 1) 100 parts by weight of a 10 μm montmorillonite powder and 20 parts of a silane coupling agent KH792 were homogeneously mixed in 200 parts of water, reacted for 24 hours at 60° C., washed several times and then dried at 70° C.; and 2) 30 parts by weight of EVA (melt index: 20.3), 70 parts of modified montmorillonite powder, 0.05 parts of irradiation sensitizer trimethylolpropane trimethacrylate, and 0.02 parts of antioxidant 168 were homogeneously mixed at room temperature, and fed into a twin-screw extruder having an aspect ratio of 36 for extrusion pelletization (recorded as pellets E), wherein the rotational speed of the extruder was 100 r/min, and the temperature ranges of the various sections of the extruder were: feeding section 150-170° C., melting section 190-200° C., mixing section 190-200° C., exhaust section 170-190° C., and homogenization section 160-180° C.

EXAMPLE 2.10

A 3D Printing Article Prepared From the Composite Material of Example 2.9

The pellets E obtained in Example 2.9 were added to the head of the 3D printer, and heated and melted in the head, the head was moved along the sectional profile and the filling path of the part while at the same time the melted material was extruded, by utilizing the hot meltability and adhesion of the material, it was rapidly solidified after extrusion under computer control, and irradiation was carried out using electron beam (electron accelerator energy of 2 MeV, power of 150 KW, and irradiation dose of 5 KGy), so that the material was crosslinked, and formed shape by accumulation layer by layer.

The obtained 3D printing article had excellent mechanical strength, dimensional stability and flame retardancy.

EXAMPLE 2.11

A High Filling Level Micro-Nano Powder/Polymer Composite Material for 3D Printing 1) 100 parts by weight of 10 μm of laponite powder and 15 parts of silane coupling agent DL602 were homogeneously mixed in 200 parts of water, reacted for 24 hours at 60° C., washed several times and then dried at 70° C.; and 2) 10 parts by weight of ABS (melt index: 14.5), 90 parts of modified laponite powder, 0.05 parts of irradiation sensitizer trimethylolpropane trimethacrylate, and 0.02 parts of antioxidant 168 were homogeneously mixed at room temperature, and fed into a twin-screw extruder having an aspect ratio of 36 for extrusion pelletization (recorded as pellets F), wherein the rotational speed of the extruder was 100 r/min, and the temperature ranges of the various sections of the extruder were: feeding section 150-170° C., melting section 190-200° C., mixing section 190-200° C., exhaust section 170-190° C., and homogenization section 160-180° C.

EXAMPLE 2.12

A 3D Printing Article Prepared From the Composite Material of Example 2.11

The pellets F obtained in Example 2.11 were added to the head of the 3D printer, and heated and melted in the head, the head was moved along the sectional profile and the filling path of the part while at the same time the melted material was extruded, by utilizing the hot meltability and adhesion of the material, it was rapidly solidified after extrusion under computer control, and irradiation was carried out using electron beam (electron accelerator energy of 2 MeV, power of 150 KW, and irradiation dose of 5 KGy), so that the material was crosslinked, and formed shape by accumulation layer by layer. The obtained 3D printing article had excellent mechanical strength, dimensional stability and flame retardancy.

EXAMPLE 2.13

A High Filling Level Micro-Nano Powder/Polymer Composite Material for 3D Printing 10 parts by weight of ABS (melt index: 14.5), 90 parts of laponite powder, 0.05 parts of irradiation sensitizer trimethylolpropane trimethacrylate, and 0.02 parts of antioxidant 168 were homogeneously mixed at room temperature, and fed into a twin-screw extruder having an aspect ratio of 36 for extrusion pelletization (recorded as pellets F1), wherein the rotational speed of the extruder was 100 r/min, and the temperature ranges of the various sections of the extruder were: feeding section 150-170° C., melting section 190-200° C., mixing section 190-200° C., exhaust section 170-190° C., and homogenization section 160-180° C.

EXAMPLE 2.14

A 3D Printing Article Prepared From the Composite Material of Example 2.13

The pellets F1 obtained in Example 2.13 were added to the head of the 3D printer, and heated and melted in the head, the head was moved along the sectional profile and the filling path of the part while at the same time the melted material was extruded, by utilizing the hot meltability and adhesion of the material, it was rapidly solidified after extrusion under computer control, and irradiation was carried out using electron beam (electron accelerator energy of 2 MeV, power of 150 KW, and irradiation dose of 5 KGy), so that the material was crosslinked, and formed shape by accumulation layer by layer.

The obtained 3D printing article had excellent mechanical strength (slightly lower than the article of Example 12), dimensional stability and flame retardancy.

EXAMPLE 3.1

A 3D Printing Article A Prepared From UV Radiation Crosslinked Polymer Composition for 3D Printing and Material Prepared Therefrom 1) 100 parts by weight of PE (molecular weight: 8500), 0.5 parts of trimethylolpropane tris (3-mercaptopropionate), 0.1 parts of an antioxidant 1010, 5 parts of micron calcium carbonate powder, and 1 part of lead chrome yellow were homogeneously mixed with a single screw extruder, and extruded into filaments having a diameter of 2.0 mm with the diameter error within 5%, the single screw extruder had a screw diameter of 70mm and an aspect ratio of 20:1, the extruder temperatures were successively set as 150-165° C., 165-175° C., 175-185° C., and 185-200° C., and the die temperature was 200-205° C.

2) The filaments obtained in step 1) were sent to the head through the filament feeding device of UPRINT 3D printer, and heated and melted in the head, the head was moved along the sectional profile and the filling path of the part while at the same time the melted material was extruded, by utilizing the hot meltability and adhesion of the material, it was rapidly solidified after extrusion under computer control, and irradiation was carried out using UV having a wavelength of 337 nm, so that the material was crosslinked, and formed shape by accumulation layer by layer, to thereby obtain article A.

The article A was yellow, and had excellent heat resistance, chemical resistance and mechanical strength as compared with common PE printed article.

EXAMPLE 3.2

A 3D Printing Article B Prepared From UV Radiation Crosslinked Polymer Composition for 3D Printing and Material Prepared Therefrom 1) 100 parts by weight of an unsaturated polyester (PET copolymerized with maleic anhydride, having a molecular weight of 8000), 1 part of trimethylolpropane tris (3-mercaptopropionate), 0.2 parts of an antioxidant 1010, and 10 parts of nano carbon powder were homogeneously mixed with a single screw extruder, and extruded into filaments having a diameter of 2.0 mm with the diameter error within 5%, the single screw extruder had a screw diameter of 70 mm and an aspect ratio of 20:1, the extruder temperatures were successively set as: 185-195° C., 190-200° C., 195-205° C., 200-210° C., and 195-205° C., and the die temperature was 215-225° C..

2) The filaments obtained in step 1) were sent to the head through the filament feeding device of UPRINT 3D printer, and heated and melted in the head, the head was moved along the sectional profile and the filling path of the part while at the same time the melted material was extruded, by utilizing the hot meltability and adhesion of the material, it was rapidly solidified after extrusion under computer control, and irradiation was carried out using UV having a wavelength of 337 nm, so that the material was crosslinked, and formed shape by accumulation layer by layer, to thereby obtain article B.

The article B was red, and had excellent heat resistance, chemical resistance and mechanical strength as compared with common PET printed product, and meanwhile the addition of nano carbon endowed the article with excellent electrical conductivity.

EXAMPLE 3.3

A 3D Printing Article C Prepared From UV Radiation Crosslinked Polymer Composition for 3D Printing and Material Prepared Therefrom 1) 100 parts by weight of PB (molecular weight: 4000), 2 parts of trimethylolpropane trimethacrylate, 0.3 parts of antioxidant 1096, 15 parts of nano $Fe_3O_4$ powder, and 3 parts of iron yellow were homogeneously mixed with a single screw extruder, and extruded into filaments having a diameter of 2.0 mm with the diameter error within 5%, the single screw extruder had a screw diameter of 70 mm and an aspect ratio of 20:1, the extruder temperatures were successively set as: 185-195° C., 190-200° C., 195-205° C., 200-210° C., and 195-205° C., and the die temperature was 215-225° C..

2) The filaments obtained in step 1) were sent to the head through the filament feeding device of UPRINT 3D printer, and heated and melted in the head, the head was moved along the sectional profile and the filling path of the part while at the same time the melted material was extruded, by utilizing the hot meltability and adhesion of the material, it was rapidly solidified after extrusion under computer control, and irradiation was carried out using UV having a wavelength of 337 nm, so that the material was crosslinked, and formed shape by accumulation layer by layer, to thereby obtain article C.

The article C was yellow, and had excellent heat resistance, chemical resistance and mechanical strength as compared with common PB printed product, and meanwhile the addition of nano $Fe_3O_4$ endowed the article with response to magnetic field.

EXAMPLE 3.4

A 3D Printing Article D Prepared From UV Radiation Crosslinked Polymer Composition for 3D Printing and Material Prepared Therefrom 1) 100 parts by weight of an unsaturated resin (copolymer of 70% of methacrylate and 30% of butadiene, having a molecular weight of 10,000), 3 parts of pentaerythritol tetrakis(2-mercaptoacetate), 0.4 parts of an antioxidant 1096, 20 parts of micron $Al_2O_3$ powder, and 4 parts of chrome green were homogeneously mixed with a single screw extruder, and extruded into filaments having a diameter of 2.0 mm with the diameter error within 5%, the single screw extruder had a screw diameter of 70 mm and an aspect ratio of 20:1, the extruder temperatures were successively set as:185-195° C., 190-200° C., 195-205° C., 200-210° C., and 195-205° C., and the die temperature was 215-225° C..

2) The filaments obtained in step 1) were sent to the head through the filament feeding device of UPRINT 3D printer, and heated and melted in the head, the head was moved along the sectional profile and the filling path of the part while at the same time the melted material was extruded, by utilizing the hot meltability and adhesion of the material, it was rapidly solidified after extrusion under computer control, and irradiation was carried out using UV having a wavelength of 337 nm, so that the material was crosslinked, and formed shape by accumulation layer by layer, to thereby obtain article D.

The article D was green, and had excellent heat resistance, chemical resistance and mechanical strength as compared with common polyacrylate printed product, and meanwhile the addition of micron $Al_2O_3$ powder endowed the article with excellent heat conductivity.

EXAMPLE 3.5

A 3D Printing Article E Prepared From UV Radiation Crosslinked Polymer Composition for 3D Printing and Material Prepared Therefrom 1) 100 parts by weight of ABS (molecular weight: about 10,000), 0.5 parts of pentaerythritol tetrakis(2-mercaptoacetate), 0.5 parts of antioxidant 168, 20 parts of micron montmorillonite powder, and 5 parts of iron blue were homogeneously mixed with a single screw extruder, and extruded into filaments having a diameter of 2.0 mm with the diameter error within 5%, the single screw extruder had a screw diameter of 70 mm and an aspect ratio of 20:1, the extruder temperatures were successively set as: 245-255° C., 255-265° C., 265-275° C., 275-285° C., and 285-300° C., and the die temperature was 300-325° C.

2) The filaments obtained in step 1) were sent to the head through the filament feeding device of UPRINT 3D printer, and heated and melted in the head, the head was moved along the sectional profile and the filling path of the part while at the same time the melted material was extruded, by utilizing the hot meltability and adhesion of the material, it was rapidly solidified after extrusion under computer control, and irradiation was carried out using UV having a wavelength of 254 nm, so that the material was crosslinked, and formed shape by accumulation layer by layer, to thereby obtain article E.

The article E was blue, and had excellent heat resistance, chemical resistance and mechanical strength as compared with common ABS printed product, and meanwhile the addition of micron montmorillonite endowed the article with excellent gas barrier property.

The invention claimed is:
1. A composition for 3D printing comprising:
benzyl methacrylate of 100 parts by weight,
α,α-diethoxyacetophenone of 2 parts by weight,
$ZrO_2$ powder of 15 parts by weight,
trimethylolpropane triacrylate of 30 parts by weight,
liquid polysulfide rubber of 10 parts by weight, and
cadmium red of 10 parts by weight,
wherein the trimethylolpropane triacrylate crosslinks with the benzyl methacrylate, and
the $ZrO_2$ powder has a particle size between 1 μm and 10 μm, and is modified by a surface modifier that is dopamine or a silane coupling agent.

2. The composition for 3D printing of claim 1, further comprising 0.1 to 0.5 parts by weight of an antioxidant selected from pentaerythritol tetra[β-(3,5-di-tert-butyl-4-hydroxyphenyl) propionate], 3,3'-bis(3,5-di-tert-butyl-4-hydroxyphenyl)-N,N'-hexamethylenedipropionamide, tris [2,4-di-tert-butylphenyl] phosphite, and mixtures thereof.

3. A composition for 3D printing, consisting of benzyl methacrylate of 100 parts by weight, α,α-diethoxyacetophenone of 2 parts by weight, $ZrO_2$ powder of 15 parts by weight, trimethylolpropane triacrylate of 30 parts by weight, liquid polysulfide rubber of 10 parts by weight, and cadmium red of 10 parts by weight.

4. The composition for 3D printing of claim 3, wherein the $ZrO_2$ powder has a particle size between 1 μm and 10 μm, and is modified by a surface modifier that is dopamine or a silane coupling agent.

* * * * *